(12) United States Patent
Edwards et al.

(10) Patent No.: US 6,975,939 B2
(45) Date of Patent: Dec. 13, 2005

(54) MAPPING PATTERNS OF MOVEMENT BASED ON THE AGGREGATION OF SPATIAL INFORMATION CONTAINED IN WIRELESS TRANSMISSIONS

(75) Inventors: Daniel L. Edwards, Manassas, VA (US); R. Justin Simpson, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 682 days.

(21) Appl. No.: 10/206,757

(22) Filed: Jul. 29, 2002

(65) Prior Publication Data

US 2003/0050754 A1 Mar. 13, 2003

(51) Int. Cl.[7] .............................. G01S 3/02; H04Q 7/22
(52) U.S. Cl. ...................... 701/209; 701/208; 701/214; 455/456.1; 455/456.3
(58) Field of Search ................................ 701/200, 201, 701/208, 209, 214

(56) References Cited

U.S. PATENT DOCUMENTS

| | | | | |
|---|---|---|---|---|
| 5,166,878 A | * | 11/1992 | Poelstra | ...................... 701/200 |
| 5,299,132 A | | 3/1994 | Wortham | |
| 5,935,194 A | * | 8/1999 | Talbot et al. | ................ 701/214 |
| 5,936,571 A | * | 8/1999 | Desjardins | .................. 701/213 |
| 6,128,501 A | * | 10/2000 | Ffoulkes-Jones | ......... 455/456.3 |
| 6,150,961 A | | 11/2000 | Alewine et al. | |
| 6,243,657 B1 | * | 6/2001 | Tuck et al. | .................. 702/150 |
| 6,400,690 B1 | | 6/2002 | Liu et al. | |
| 2001/0007699 A1 | | 7/2001 | Winter et al. | |
| 2003/0195008 A1 | * | 10/2003 | Mohi et al. | .............. 455/456.5 |

OTHER PUBLICATIONS

Burgess, D. A., Supporting Rosum Positioning Technology in a GSM Network, Rosum Corp., Redwood City, CA 94063 Mar. 19, 2002, pp. 1–6.
Rabinowitz, M and J. Spilker, Postitioning Using the ATSC Digital Television Signal, Rosum Corp., undated pp. 1–16.

* cited by examiner

*Primary Examiner*—Nick Corsaro
*Assistant Examiner*—Angelica Perez

(57) ABSTRACT

Time-tagged coordinates from session-unique transmissions of wireless devices are collected routinely and stored for later analysis. From this data, one may derive a sequence of wireless device operation from which attributes may be ascertained. Sequences are accumulated until a dense aggregate pattern (900) is formed over a geographic area. Aggregate data is sorted into ranges representing speed of movement and then converted to pixels representing cells (401) in an aggregate matrix (400). Heavily weighted values (402) are assigned to cells (401) that represent a location within a pre-specified spatial error (100) about a data point (101). Lower values are assigned to cells (401) representing paths (200), or corridors, connecting these better-identified locations. As more transmission sessions (500) are added to the matrix (400), the largest weight values (402) cluster as individual cells (401) representing a most likely path (1001). Thus precise topographic attributes may be derived based on these spatial clusters (FIG. 11A), overlapping paths connecting them (1001), or combinations (FIG. 15A) thereof.

27 Claims, 14 Drawing Sheets

MAPPING PATTERNS OF MOVEMENT BASED ON THE AGGREGATION OF SPATIAL INFORMATION CONTAINED IN WIRELESS TRANSMISSIONS

STATEMENT OF GOVERNMENT INTEREST

The invention described herein may be manufactured and used by or for the Government of the United States of America for governmental purposes without the payment of any royalties thereon or therefor.

FIELD OF THE INVENTION

The field concerns manipulation of data to reduce error estimates, in particular it involves processing data routinely collected on wireless device operation to precisely map patterns.

BACKGROUND

Wireless technology enables portable communications, computing, and positioning, often within a single device. The value of information derived from an active connection to the World Wide Web while a user is both mobile and spatially positioned accurately is immense. Uses for this information include: asking for directions without stopping, identifying services along your route, accessing commercial invitations based mostly on proximity of a business to the mobile invitee, and requesting emergency services, among others.

Spatial coordinates of longitude, latitude, and elevation may be represented in a three-dimensional (3-D) coordinate system as x, y, and z, respectively. These coordinates, as well as a time associated with them and a unique identifier assigned to a transmission session of a subscriber using the service at that time, are collected routinely by providers of cellular telephone service. The session identifier enables one to establish a string of distinct spatial positions that may yield a pattern of the subscriber's movement, or lack thereof. These data are collected routinely and stored for various uses by the wireless service provider. In general these uses relate to billing, system performance evaluation, or planning for new capacity and the like. Other uses may be made of this data. For example, these "strings of data" may be aggregated over time, for a number of subscribers, and a dense aggregate pattern observed. From this pattern, precise spatial information about specific locations or areas may be derived, including 3-D coordinates suitable for accurate mapping.

Several patents and one patent application address mapping problems as associated with wireless device operation. None approach a method that the present inventors propose herein.

U.S. Pat. No. 5,299,132, Vehicle Locating and Communicating Method and Apparatus Using Cellular Telephone Network, to Wortham, Mar. 29, 1994, provides a means for locating and communicating with vehicles. A cell phone and microprocessor are carried in the vehicle. The microprocessor interrogates the cell phone to obtain location information from a message stream transmitted from various cell phone transmitter sites. This may be displayed within the vehicle and used to update vehicle location at a central monitoring site.

U.S. Pat. No. 6,150,961, Automated Traffic Mapping, to Alewine et al., Nov. 21, 2000, proposes a system that uses a system of mobile wireless units installed in multiple vehicles for purposes of mapping traffic. The wireless units provide both communications and location. The location of each vehicle is provided to both other such vehicles and a central monitoring station for purposes of monitoring traffic flow.

U.S. Pat. No. 6,400,690 B1, Dual Map System for Navigation and Wireless Communication, to Liu et al., Jun. 4, 2002, details a system that produces an empirical map of coverage of a wireless communication system by combining information from individual users of the system. The users must be equipped with a GPS receiver or located by other means such as triangulation from ground-based transmitters. The quality of the wireless transmission is also used as a parameter to develop the empirical maps.

U.S. Patent Application No. 2001/0007088 A1, Method and Navigation System for Display of Sections of a Digital Map Data Base as well as an Improved Operating Unit and Interface for Same, to Winter et al., Jul. 5, 2001 provides a method and system for displaying a predetermined portion of a digital map database together with a limited number of attributes, thus making the map easier to read where many attributes may otherwise be available.

To communicate an adequate spatial awareness, maps are needed to guide one from a known or starting position to a destination. Road locations, street names, landmarks, directions, etc., originate from an existing database of spatial information. A problem often encountered by those depending on commercial hardcopy maps or maps now available on the Internet is that sufficiently detailed digital spatial information is not available worldwide. Further, it is not available at the spatial accuracy that could be used optimally by existing and future wireless communication and positioning devices. For example, the U.S. Geological Survey (USGS) produces digital maps at a scale of 1:24,000 with a National Map Accuracy Standard of 40 feet horizontal (for "well-defined points" only such as survey bench marks and major road intersections). In contrast, the stated positional error for one manufacturer of wireless remote locator devices is "several meters under certain circumstances." Furthermore, the coverage of USGS 1:24,000 data is not complete even over some areas of the United States.

The problem is further compounded in that sufficiently detailed information is not available for most of the world and the vast majority of data that are available are not accurate enough to enable precise display of wireless positioning data relative to a displayed map's features. This reduces consumer confidence in precise destination route planning or spatial problem solving, for example. Optimized wireless mobile computing, communication, and positioning technology needs a quality of spatial information that is not available from standard mapping products. Thus, there is a need for a process that generates detailed, spatially accurate features by fully utilizing the capabilities of existing and future mobile wireless devices.

SUMMARY

A preferred embodiment of the present invention envisions an automated method of producing precise pattern mapping based on processing position data routinely collected from the operation of wireless communication and positioning devices. Since, in the main, operation is by humans co-located with these mobile devices, maps resultant therefrom represent aggregated spatial information of human patterns of movement from which positioning may be derived and further refined to yield accurate pattern mapping.

Spatial coordinates may be designated in a three-dimensional (3-D) coordinate system as longitude (x), latitude (y), and elevation (z). In commercial operations, the 3-D coordinates, time, and unique identification codes from mobile wireless devices are gathered routinely and stored on a server. The wireless service provider assigns an identification code for each transmission session of a subscriber. These data are collected continually.

The code allows the unique connection of a string of distinct spatial positions from a single "transmission session" into a spatial pattern of an individual's movement. The data may be sorted by speed, and may be stored without processing until sufficient data are available to recreate a dense aggregate pattern for a specific area. This aggregate position data may be converted to a raster representation that is constrained to be no more than one-half the resolution of the positional accuracy of the spatial coordinates thus collected. If the data are based on very accurate coordinates, such as obtained from differential GPS or digital TV video signals, then the resolution of the raster cell may be determined by the size of the spatial feature to be collected. Rabinowitz, M, and J. Spilker, *Positioning Using the ATSC Digital Television Signal*, Rosum White Paper, Rosum Corporation, Redwood City, Calif., undated. Burgess, D. A., *Supporting Rosum Positioning Technology in a GSM Network*, Rosum Corporation, Redwood City, Calif., Mar. 19, 2002.

Points in a transmission session are sorted by time of transmission. Successive points in a transmission session are surrounded by a transmission corridor that is an approximation to the subscriber's location. The raster cells in a transmission corridor are assigned weights that approximate the subscriber's probability of being in the cell. When weights are assigned to all transmission corridors within a transmission session, these transmission corridors are added to a matrix of all cells in the geographic area of interest to build an aggregation matrix. A connected network of spatial features is derived, based on observed clusters representative of the distribution of weighted cells in the aggregation matrix. This may be used to represent a refined accurate pattern, or map, from the aggregated spatial positions since spatial features are vectors mathematically derived from patterns in the aggregation matrix. A digital map is but a collection of vectors and their assigned attributes such as road, building, stream, parking lot, etc.

A preferred embodiment of the present invention provides a method of attaining spatial precision using data routinely collected from wireless transmission sessions that are assigned unique identifiers. It includes:

identifying a source of time-tagged data points describing spatial information that is uniquely attributable to a session;

selecting and accessing pre-specified data points collected from a pre-specified geographic area;

ascertaining the spatial circular error of probability (CEP) about each pre-selected data point (circular error will vary in accuracy and reliability depending on the type of positioning technique used by the wireless service provider);

sorting the data points by an individual session's unique identifier;

optionally calculating an approximate speed associated with a successive pair of points in a transmission session by dividing a distance interval between successive data points by an associated time interval, $\Delta T$, between successive transmission points;

optionally sorting the transmission session data according to pre-specified speed ranges associated with movement of the subscribers, so that the sorting differentiates categories of subscribers;

optionally representing data from each successive pair of transmissions as a transmission corridor;

optionally converting the representation of a transmission corridor to cells in a matrix;

assigning numerical weights to individual cells in the matrix based on the pre-specified CEP associated with the location provided from an individual transmission event and the number of optionally derived transmission corridors or individual transmissions themselves that overlap within each individual cell;

aggregating the weighted cells based on connectivity or clusters that may be linear, areal or both within a given pre-specified geographic area or interest;

converting the resultant cell aggregate to a vector representation; and ascertaining attributes of each vector representation, possibly through comparison to a look-up table or other stored library of attributes.

Results may be used to precisely pattern map through the aggregation of spatial patterns of movement (or lack thereof) by classes of subscribers. Further, the results may be stored prior to composing a precise map of patterns or even used to compose a precise topographic map.

Pattern maps may be composed by manipulating data representing wireless transmissions from sources located on: land-based vehicles, airborne vehicles, waterborne vehicles, space borne vehicles, humans, and animals, and combinations thereof, such as a human on horseback or a human riding in a bus while moving about therein. The term vehicles includes those contrivances that may be operated remotely and not carry a human operator, such as a robot.

Spatial precision may be attained in each of three dimensions: latitude, longitude, and elevation or in any two of the three, such as latitude and longitude in cases where elevation data may be suspect or missing.

Wireless transmissions may originate from devices such as: cellular telephones, laptop computers, personal digital assistants (PDAs), portable communications devices, geopositioning systems such as may be provided using LORAN®, Global Positioning Systems (GPS), beacons, alarms, security systems, robots, unmanned ground vehicles, and combinations thereof.

Further, spatial precision may be attained with respect to pre-specified time periods of operation of wireless devices or at pre-specified locations. Advantages of a preferred embodiment of the present invention include:

additional data collection resources not needed;

multiple objectives may be obtained through manipulation of existing data in different ways;

increased precision in mapping high population areas that require more precision to precisely identify features that are crowded into small spaces;

suitable for implementing commercial purposes to target specific consumers at both the optimum time and location;

suitable for increasing precision in law enforcement, security, homeland defense, and public safety applications;

suitable for current use by government agencies in planning and implementing for traffic control and dispersal of public safety resources geographically and temporally; and low cost to operate and maintain when compared to a distinct separate collection and analysis effort.

DETAILED DESCRIPTION

A preferred embodiment of the present invention provides a method for mapping precise patterns. It may be useful for composing precise topographic maps of an area about which fine detail is desired. These patterns are derived from processing routinely collected data that yield information on the position of wireless devices at precise times. This information may be provided as static (taken at long intervals or at specific times only) or dynamic (taken at short durations continually).

Figure 1A:
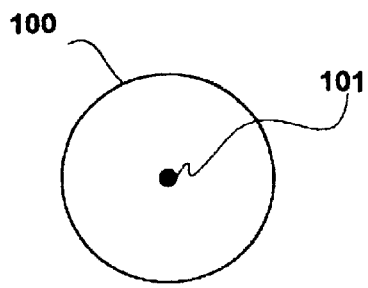
FIG. 1A depicts a circular area representing the spatial uncertainty about the dot in the center reported as the location of the wireless device.
Figure 1B:
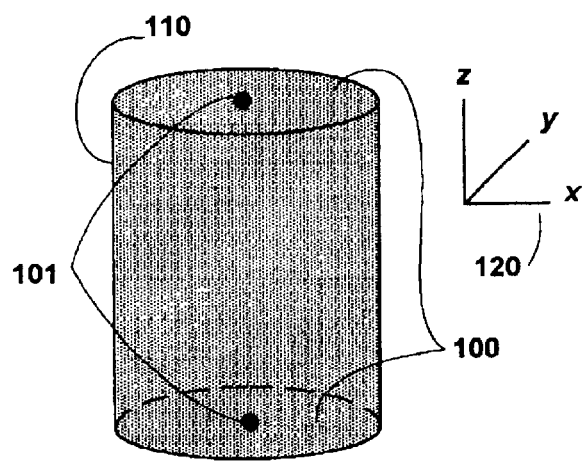
FIG. 1B represents a three-dimensional version of FIG. 1A in which elevation data are used.

Refer to FIG. 1B. The method uses input of the following data: time-tagged spatial coordinates x, y, and z (if the latter is available) 120 as provided from a wireless transmission, i.e., the time of transmission is associated with specific coordinates, and an identification code that serves to uniquely identify a coordinate or a series of coordinates with a unique transmission session. This data may be accessed from an "online" database or may be retrieved from storage.

Figure 3:
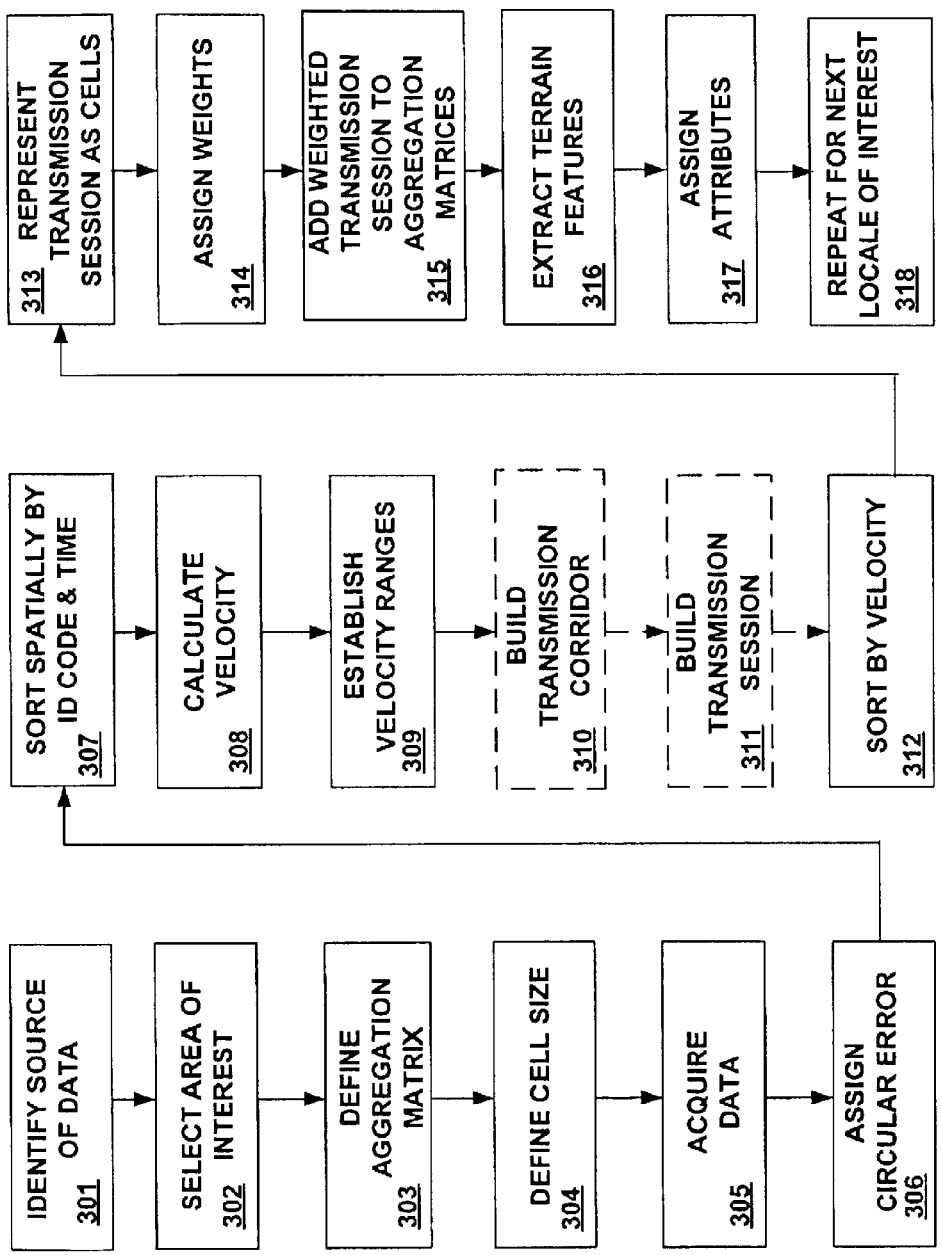
FIG. 3 is a block diagram of steps used to implement a preferred embodiment of the present invention that optionally sorts data by speed ranges.
Figure 4A:
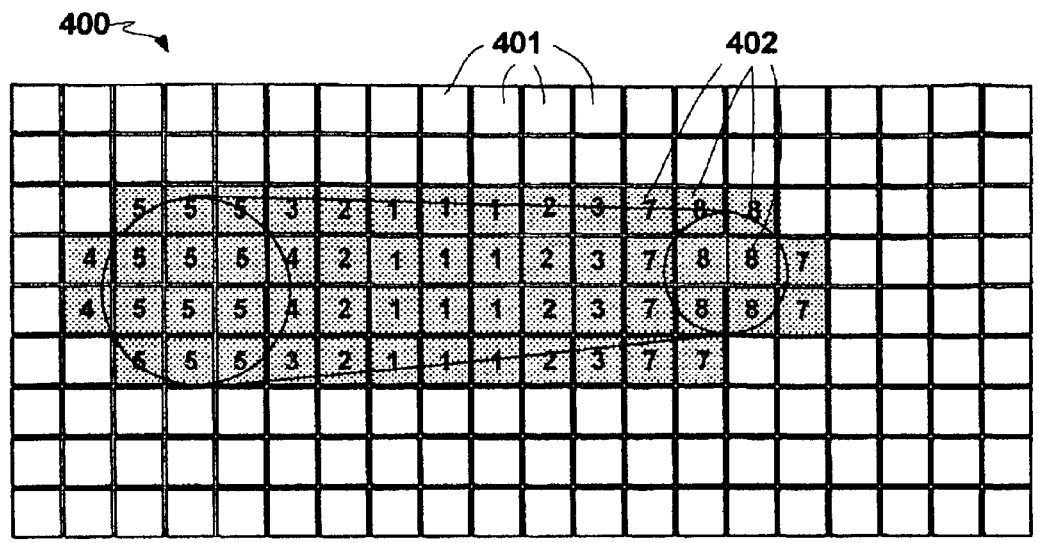
FIG. 4A represents a 2D matrix with cells "filled" with "whole number" weights for a single transmission corridor that is added to an aggregation matrix to which all pre-sorted transmission sessions for a given geographic area are aggregated.
Figure 4B:
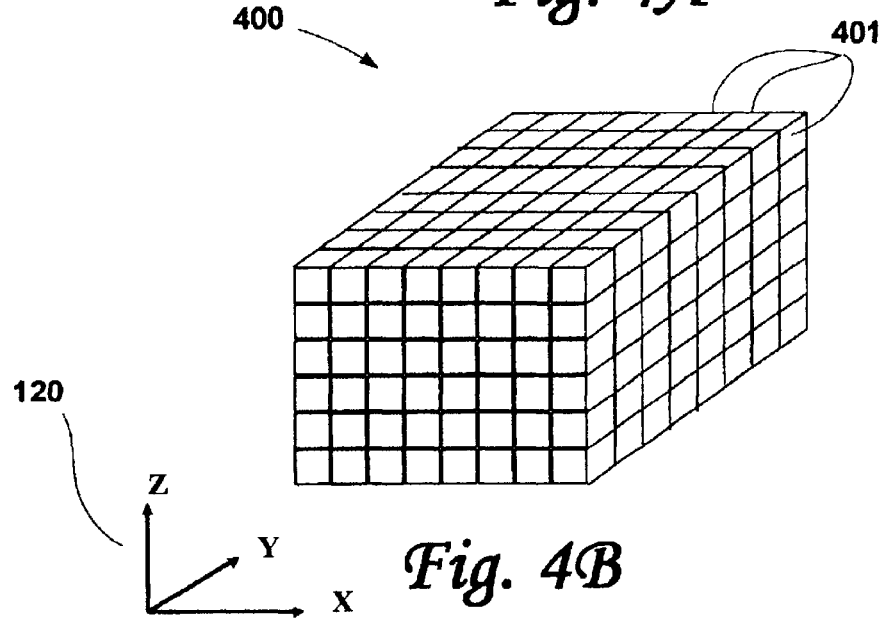
FIG. 4B represents the cells of a 3D aggregation matrix that may be used for depicting elevation information in addition to latitude and longitude.

Refer to FIG. 3 for the steps of the process and FIG. 4 at A and B for matrices used in the process. One or more sources of the data are identified 301 and a geographic locale, or area of interest, is selected 302. A uniform grid (not separately shown) is superimposed on a spatial area of interest. A matrix 400 is defined 303 to capture elements of the grid. A smallest element of the grid is defined 304 and is termed a cell 401 or raster cell. Thus this area of interest may be represented by a matrix 400 of these cells 401, termed the aggregation matrix 400, whose entries correspond one-to-one to the raster cells. A cell 401 may be either two or three dimensional as shown in FIG. 4 at A and B, respectively.

To insure statistical validity, the cell size is chosen to be no larger than one-half the resolution of the positional accuracy of the spatial coordinates provided in association with a transmission session of the wireless device in the area of interest. If the data are based on very accurate coordinates, such as obtained from differential GPS or digital TV video signals, then the resolution of the cell 401 may be determined by the size of the spatial feature to be collected.

Data are acquired 305 from one or more sources and a spatial error is assigned 306. The data are sorted 307 spatially, temporally and by unique ID code associated to a transmission session. For example, data may be sorted over and within a specific smaller rectangular area of interest in the larger geographic area that may be represented by the entire data set. Steps that build 310, 311 transmission corridors and transmission sessions therefrom are optional as indicated by the dotted lines in FIG. 3.

Approximate velocities may be calculated 308 for individual transmission session ID codes by dividing the distance between successive coordinates by the appropriate time interval, $\Delta T$. Next, speed ranges may be established 309.

These sorted data may be used to build 310 2-D 200 or 3-D 210 transmission corridors. A transmission corridor 200, 210 represents a "path" that is associated with two successive times a wireless device is operating, i.e., distance over a time interval. It is possible to construct these because each discrete collected time of transmission is associated with geographic coordinates representing the location of the subscriber at that discrete time. Inherently this information also provides an approximation to the direction of travel of the subscriber. Data associated with these discrete times are collected during a uniquely coded transmission session that transmits two or more of these discrete time-tagged geographic locations to at least one control center operated by a wireless service. Thus, a number of corridors 200, 210 may be built during the uniquely coded transmission session given a sufficient time of operation of the wireless device that may facilitate building 311 a transmission session. These sessions may be sorted 312 by speed to enable specific locales to be represented optimally, e.g., for precision mapping purposes. Each such sorted session is then represented 313 as cells 401 to be added 315 to the aggregation matrix 400.

Each available coordinate 101 is associated with a spatial error estimate, represented as a transmission circle 100. Initially, those cells 401 falling entirely within a transmission circle 100 are assigned 314 a high weight indicative of the fact that the actual location of a specific transmission at a specific time falls within that circle 100 to a relatively high degree of certainty, e.g., 67% certainty. As the optionally built transmission corridors 200, 210 are added to the aggregation matrix 400, some cells 401 in the matrix 400 are coincident. The coincident cells 401 now have multiple weights assigned. These weights are added within each coincident cell. This aggregation matrix is converted to a vector representation that, with sufficient overlapping transmission sessions, maps a much more accurate pattern of wireless device operation than available from one or a few transmission sessions.

From the appropriately sorted data comprising the aggregate matrix 400, features may be extracted 316, such as terrain features or man-made features. To these features an attribute may be assigned 317, e.g., a small rectangle having change in the z direction only may be "attributed" to an elevator. Finally, this process may be repeated 318 for each category of sorted data, locale of interest, or even time of day or season, to yield desired spatial and temporal information.

Figure 2A:
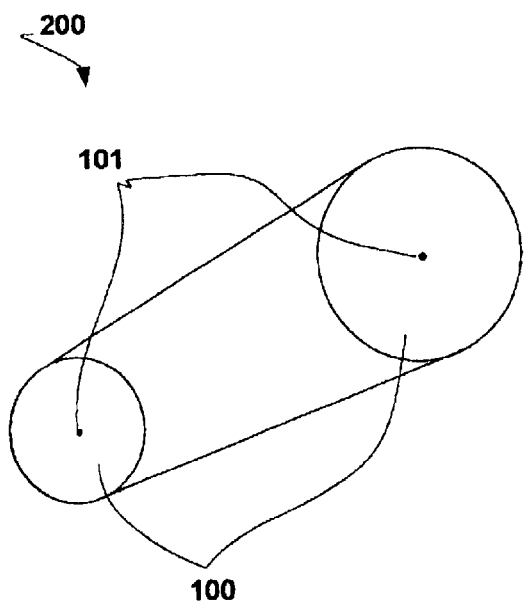
FIG. 2A represents a two-dimensional corridor that represents the geographic area of interest built from data used with a preferred embodiment of the present invention that does not include elevation information.
Figure 2B:
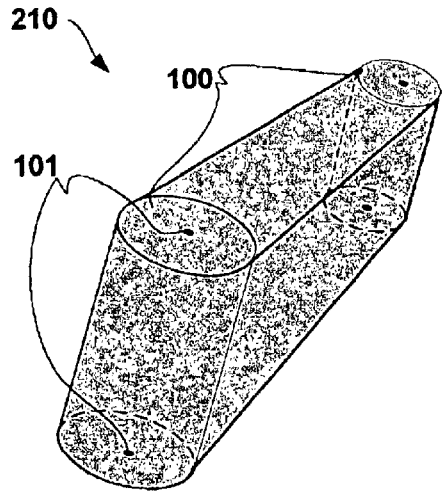
FIG. 2B represents a three-dimensional corridor built from data used with a preferred embodiment of the present invention that includes elevation information.

Again refer to FIG. 1B. If 3D data are used, the 2-D circle 100 of FIG. 1A becomes the 3-D cylinder 110 of FIG. 1B. Refer to FIG. 2A and FIG. 2B. In a preferred embodiment of the present invention, by connecting successive independent data points 101, each of which may be related to a specific transmission circle 100, and that originate from the same identification code (subscriber), it is possible to form transmission corridors 200, 210. Coordinates for which height is not available are 2-D corridors 200 as represented in FIG. 2A.

Refer to FIG. 2B. If height information is available, a 3-D corridor 210 may be obtained. Transmission corridors 200, 210 are assembled 311 into transmission sessions that represent the sequential transmissions associated with the same unique transmission session ID from the time that transmission is initiated until transmission is terminated, for example. Collections of transmission sessions are sorted 312 into speed ranges to yield categories of wireless mobile users, e.g., drivers, walkers, bikers, stationary, etc.

Refer to FIGS. 3 and 4. Weighted transmission sessions, either 2-D or 3-D, are determined as follows. The transmission corridors of a transmission session are represented 313 as cells 401 that reflect their relative position in the aggregation matrix 400 to which they are added 315. Pre-specified weights are assigned 314 to only those cells 402 along each corridor 200, 210 of a transmission session. These weights decrease in value to a pre-specified minimum weight as distance increases from the selected transmission circles 100 associated with data points 101 resident in the database. The sorted and weighted transmission corridors 200, 210 of a transmission session are added 315 to the appropriate aggregation matrix 400. Overlapped cells 401 will have multiple weights that are added to yield a cell 401 of "higher probability" of being traversed while wireless transmissions occurred. At any time after building a specific aggregate matrix 400, this step may be repeated 318 for all data in each sorted category, e.g., walking, stationary, boating, etc., even before extracting 316 features and assigning 317 attributes for each resultant aggregation matrix 400.

Figure 5:
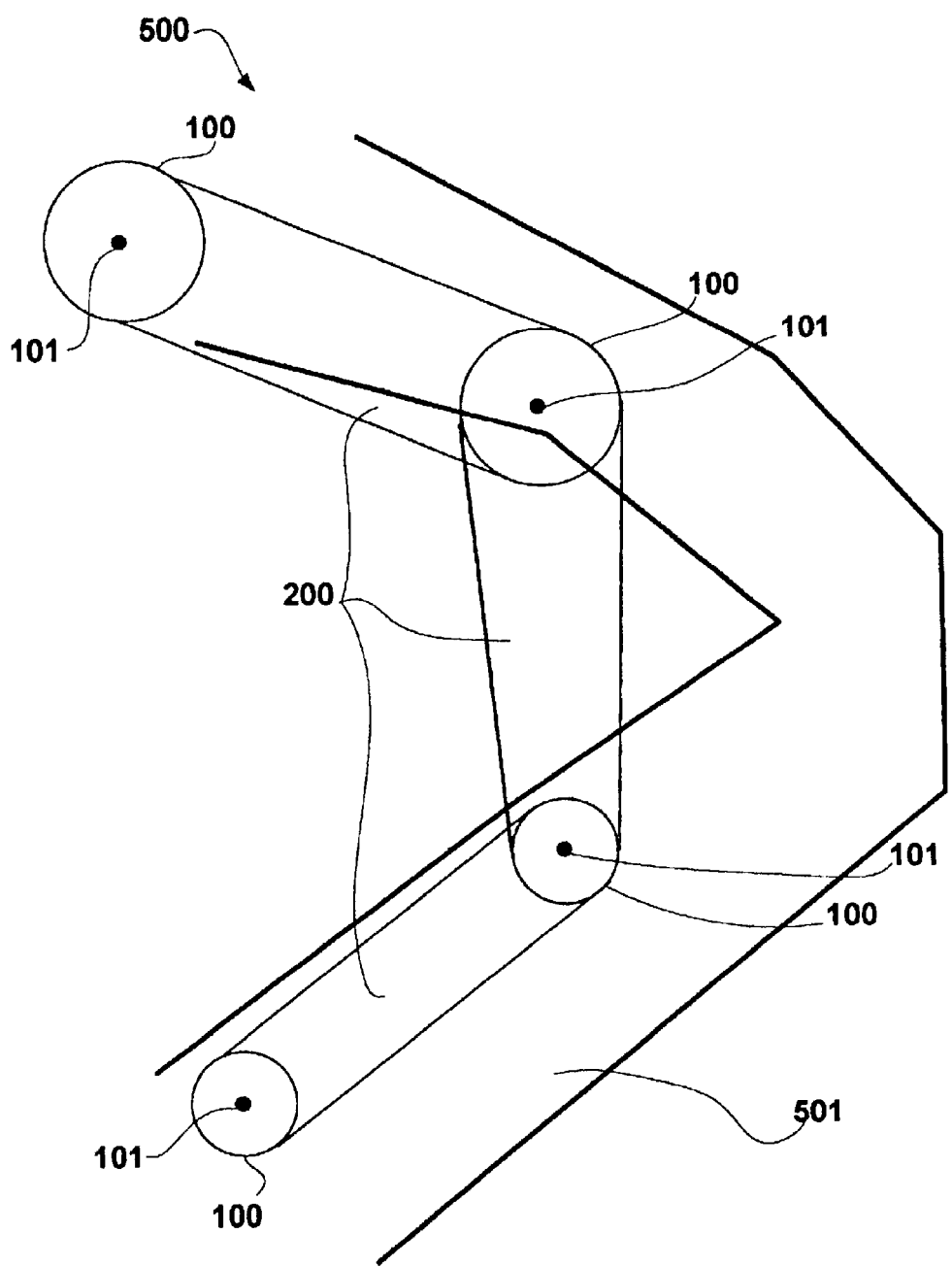
FIG. 5 represents 2D data associated with a single transmission session occurring along a road.

Refer to FIG. 5. Data from a single transmission session 500 along a road 501 is used to build three transmission corridors 200 from four data points 101 associated with a circular area 100 indicating an acceptably high probability of occurrence therein. This is a first step in getting sufficiently accurate data from which accurate position information may be derived for use in precision mapping, for example.

Figure 6:
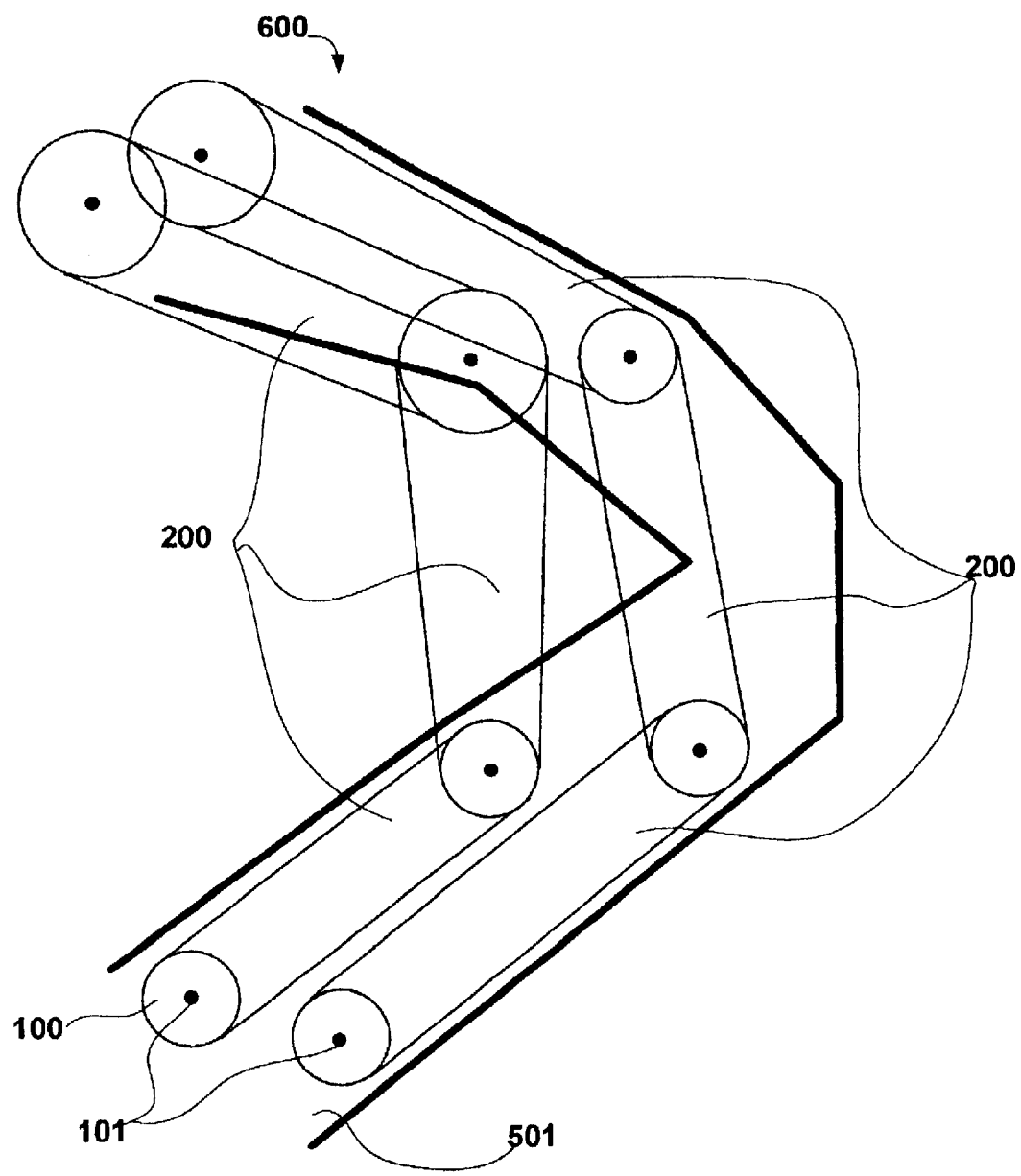
FIG. 6 represents 2D data associated with two transmission sessions and the road of FIG. 5.

Refer to FIG. 6. Data from two transmission sessions 600 is used to build six transmission corridors 200 from eight data points 101 associated with a circular area 100 indicating an acceptably high probability of occurrence therein. Note that not all circles 100 are the same size, larger circles 100 indicating that certain data points may be "suspect" relative to other data points. Decisions on data quality may be made beforehand based on the source, the geographic locale being "mapped," time of day or season, or any of a number of other factors which may affect, or provide a measure of, data quality.

Figure 7:
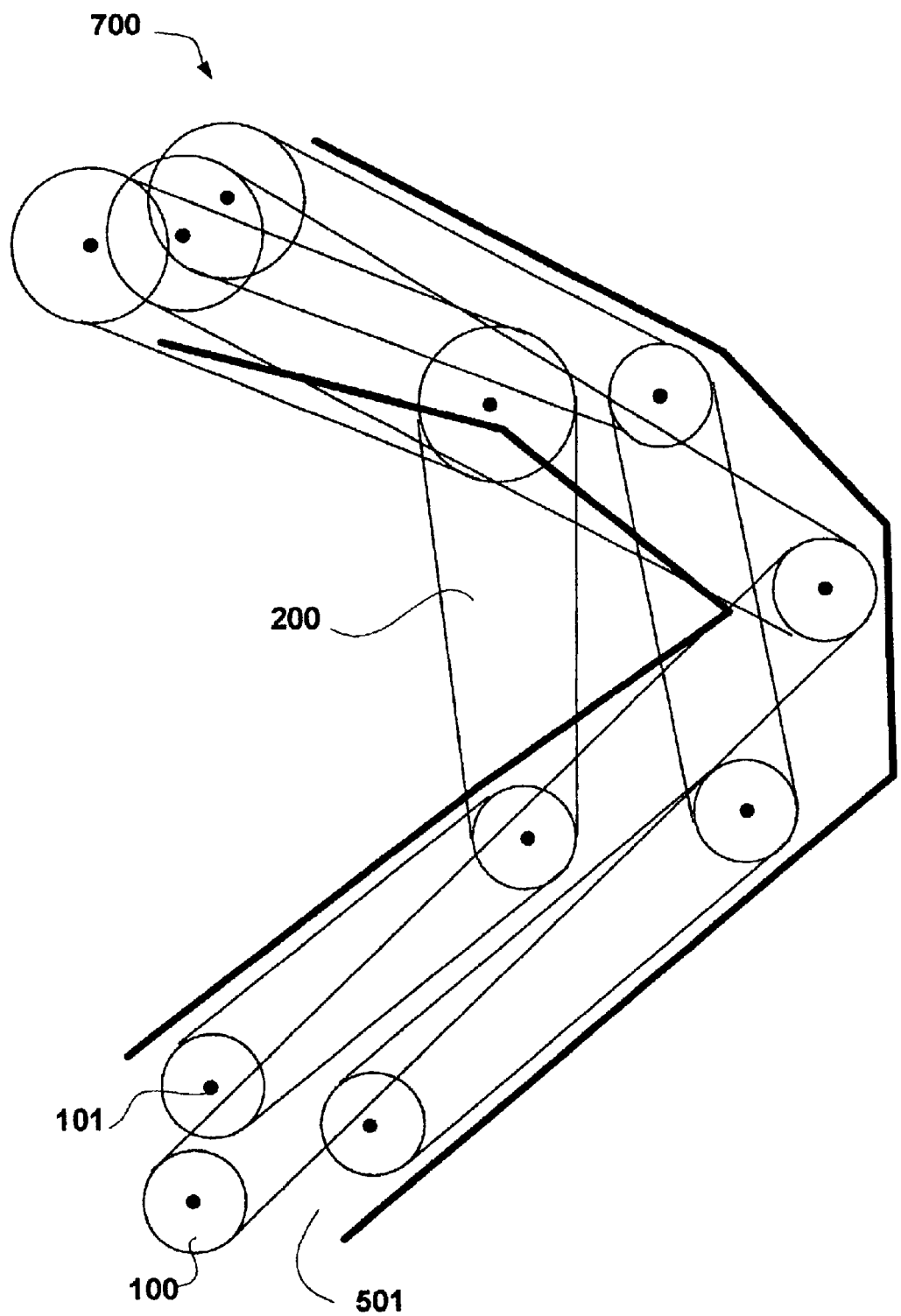
FIG. 7 represents 2D data associated with three transmission sessions and the road of FIG. 5.

Refer to FIG. 7. Here three data transmission sessions 700 are depicted with a first sign of overlap among the transmission corridors 200, where 11 data points 101 and eight corridors 200 are associated with the three data transmission sessions. As can be surmised from this buildup of transmission sessions, there will be more overlap as more sessions are added. Areas of commonality, or overlap, as the transmission sessions are added indicate a "most likely" route of wireless users over time. That is, the more data added, the more likely the route indicated by the densest overlap areas is the actual route progressed by the wireless users. This is very useful for composing maps having fine detail.

Figure 8:
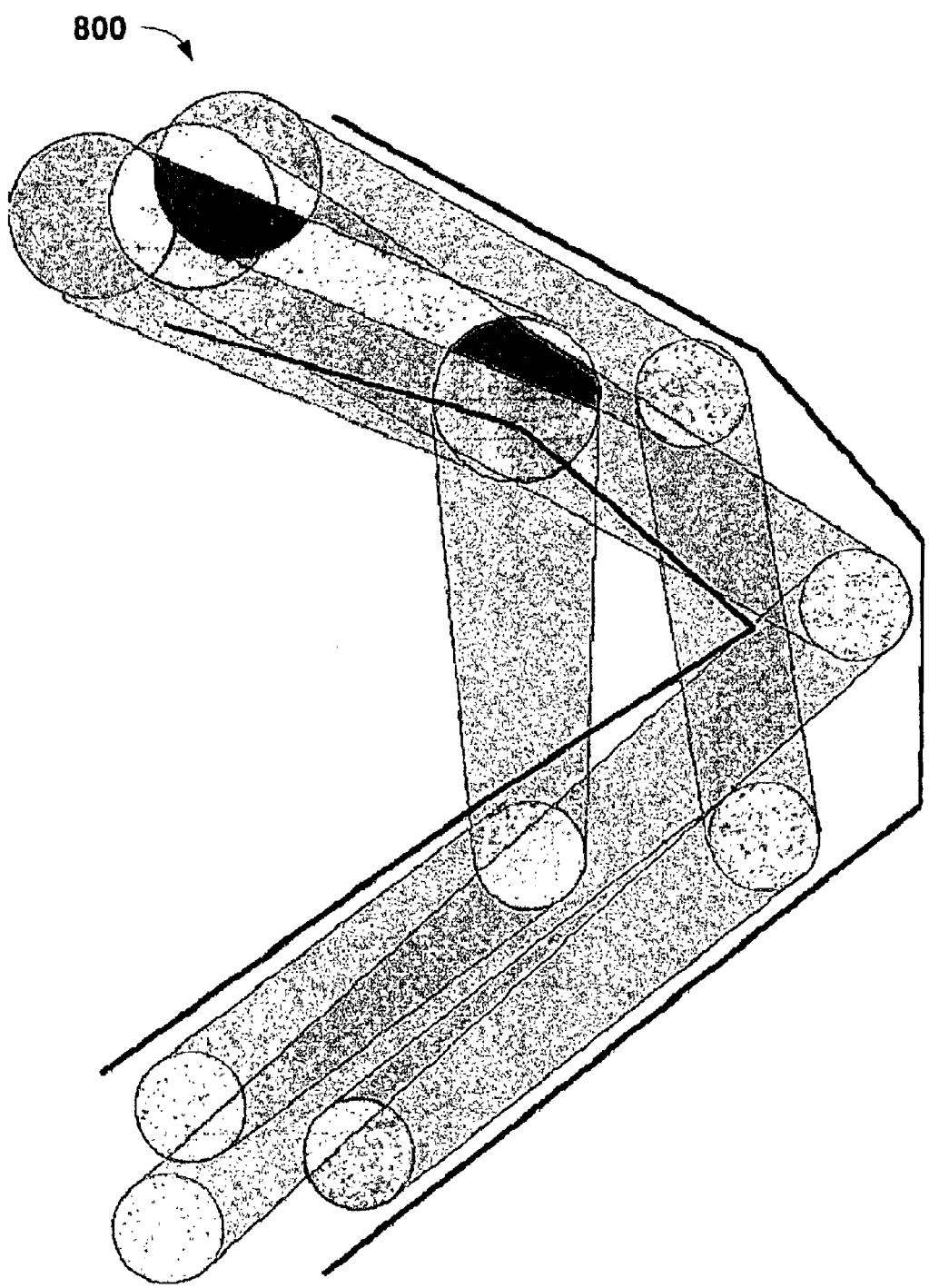
FIG. 8 represents the sum of the 2D data associated with the three weighted transmission sessions of FIG. 7 in which dark shading of an area represents overlapping of corridors and the darkest shading also representing overlapping of cells initially assigned a higher probability, i.e., greater cell weight in the matrix corresponding to the circles.

Refer to FIG. 8 representing areas of overlap of FIG. 7 in relative shades, with the darkest shades indicating the most overlap (highest value of added weights in the cells 401 of the aggregate matrix 400) among the three transmission sessions. Although a definite route is difficult to discern because of the small amount of data, it can be seen that just a few more data points will significantly improve any estimate of the location of the road 501.

Figure 9:
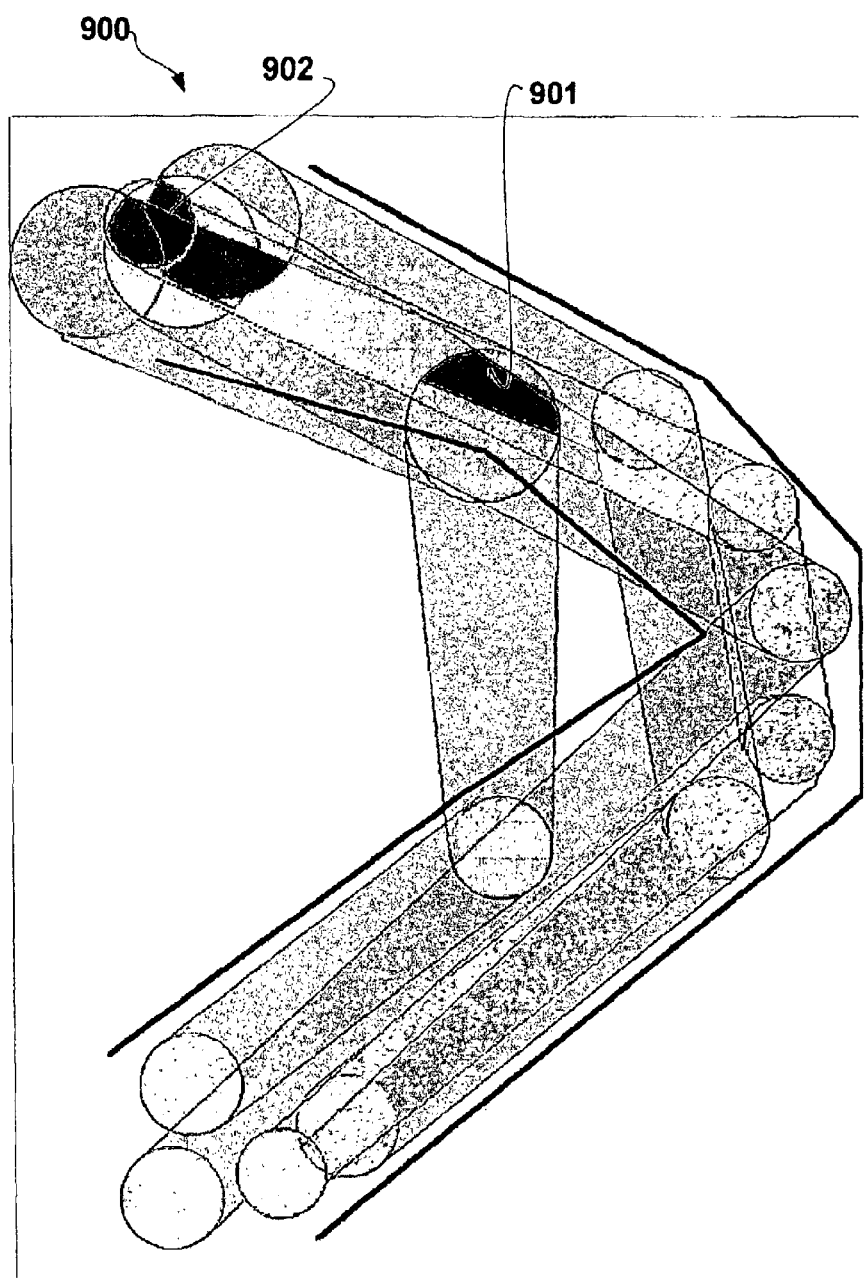
FIG. 9 represents the sum of 2D data associated with four weighted transmission sessions loaded into the same matrix as FIG. 8 was loaded.

Refer to FIG. 9. Here four transmission corridors 900 are shown with shading of overlapping portions as in FIG. 8. With but a single added transmission session of four data points 101 and three transmission corridors 200, a definite route is evident by following the darkest regions on the figure. Note that even though a circle 100 may be relatively large as at 901, indicating some suspicion about the validity of location data provided with that data point, a number of overlapping transmission corridors 200 serve to reinforce common patterns and isolate the outlying information. The very dark area 902 including in a small circle indicates how quickly one may be able to get a satisfactory result if the circular area 100 of uncertainty about data points 101 is relatively small.

Figure 10:
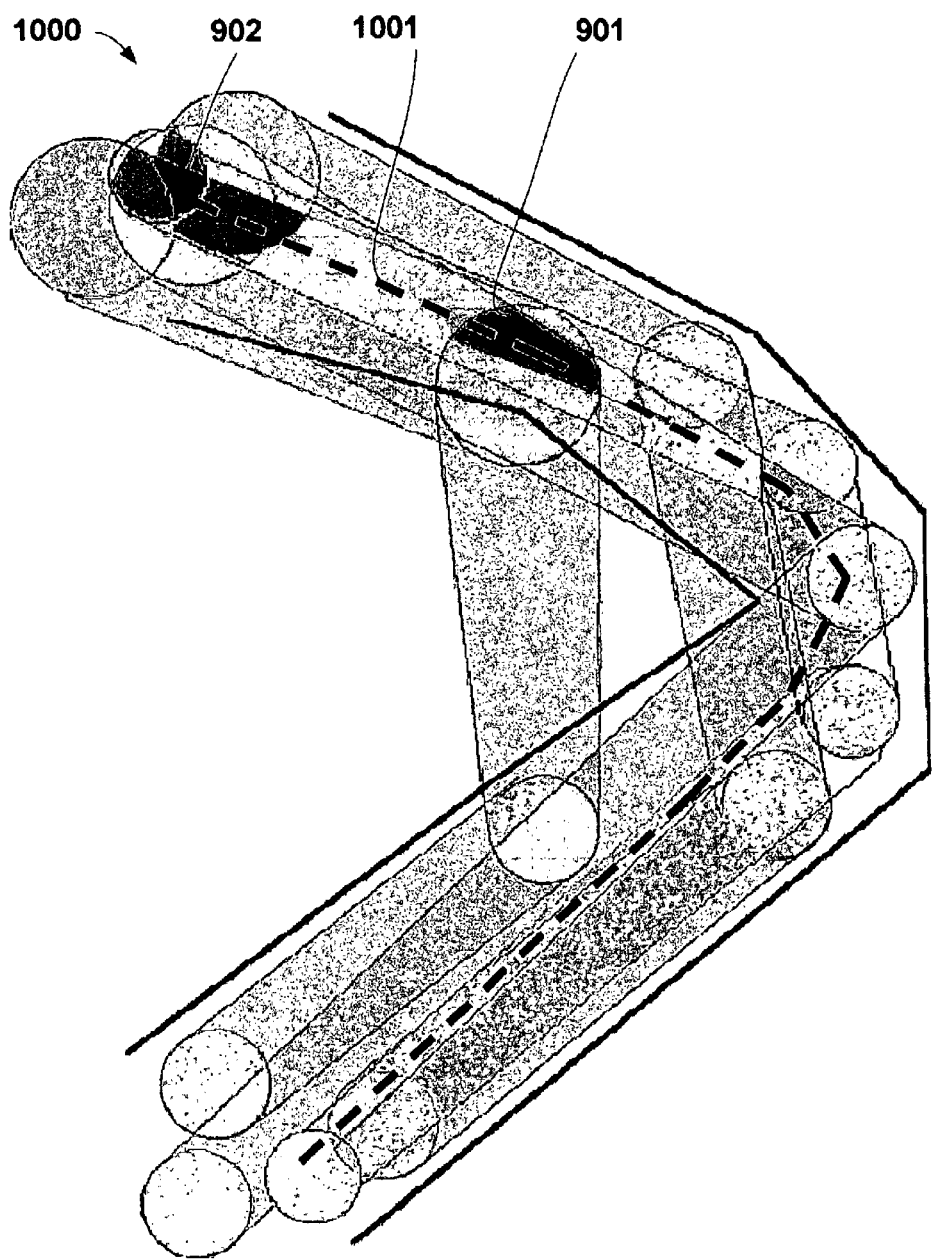
FIG. 10 represents a centerline of a road as extracted from the 2D data associated with the sum of the four weighted transmission sessions of FIG. 9.

Refer to FIG. 10. A "most probable" route 1001 is traced using the information of FIG. 9 through the darkest shaded areas of FIG. 9 to yield a first approximation 1000 after "overlapping" only four transmission sessions along the road 501. Note that the route 1001 passes through the areas 901 and 902 although these shaded areas appear in the largest and smallest circles 100, respectively. Although for descriptive purposes, this composition of a route is depicted graphically, in a preferred embodiment it is intended to be accomplished digitally by use of vectors represented by the individually aggregated weighted cells.

Figure 11:
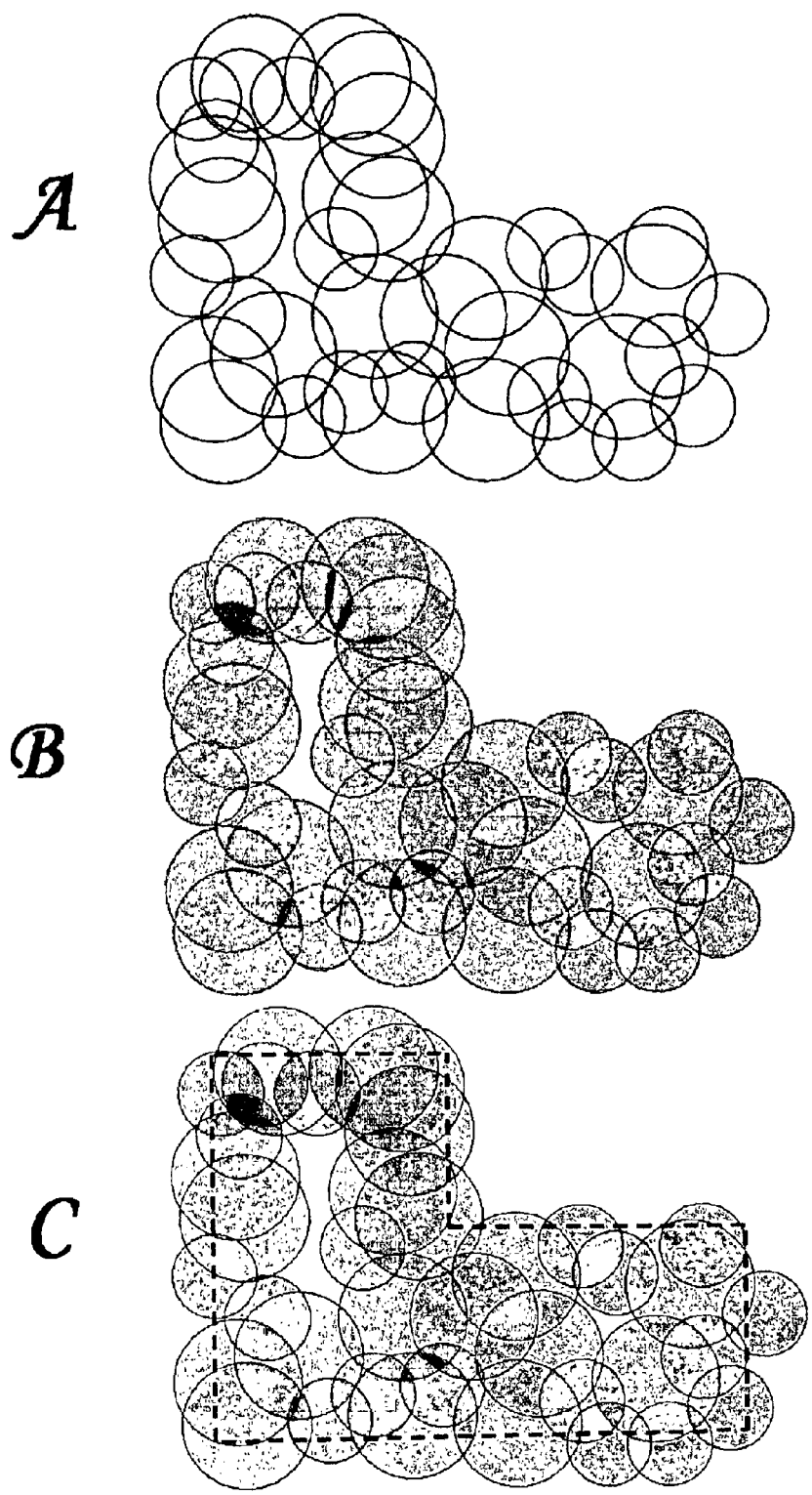
FIG. 11 represents 2D data from a collection of stationary transmissions characterized by little movement during a transmission session, clusters developed from overlapping weighted transmission sessions, and the "most likely" boundary of a structure thus defined by the aggregation matrix.

Note that in a preferred embodiment of the present invention, each aggregation matrix 400 represents a category of wireless mobile users sorted by speed. The data do not have to be sorted in this manner to be useful in other applications, however. For example, one may not be concerned with the speed range of users, only wishing to know about all users within a particular time window or even during a season. Generally, to yield useful information, within each aggregation matrix, spatial features are extracted 316 and attributes assigned 317. For example, speed, and possibly acceleration, may categorize users as any of the categories: stationary, walking, bicycling, boating, driving, and flying. Attributes such as roads, walking and biking paths, airline routes and airports, channels, and structures may be inferred. For example, repetitive patterns from a stationary location may indicate a building. FIG. 11 at A represents stationary transmissions, which are characterized by little movement in location of transmission. The only "motion" in transmission coordinates is represented by the circles 100 and is due to the error (CEP) inherent in determining the coordinates of the transmission. Thus, no transmission corridors 200, 210 are represented, nor are they required. The overlap of the transmission circles 100 is shown in FIG. 11 at B. By tracing a path through the darkest regions therein, an outline of an L-shaped structure is yielded at C, most likely an office or commercial building.

Figure 12:
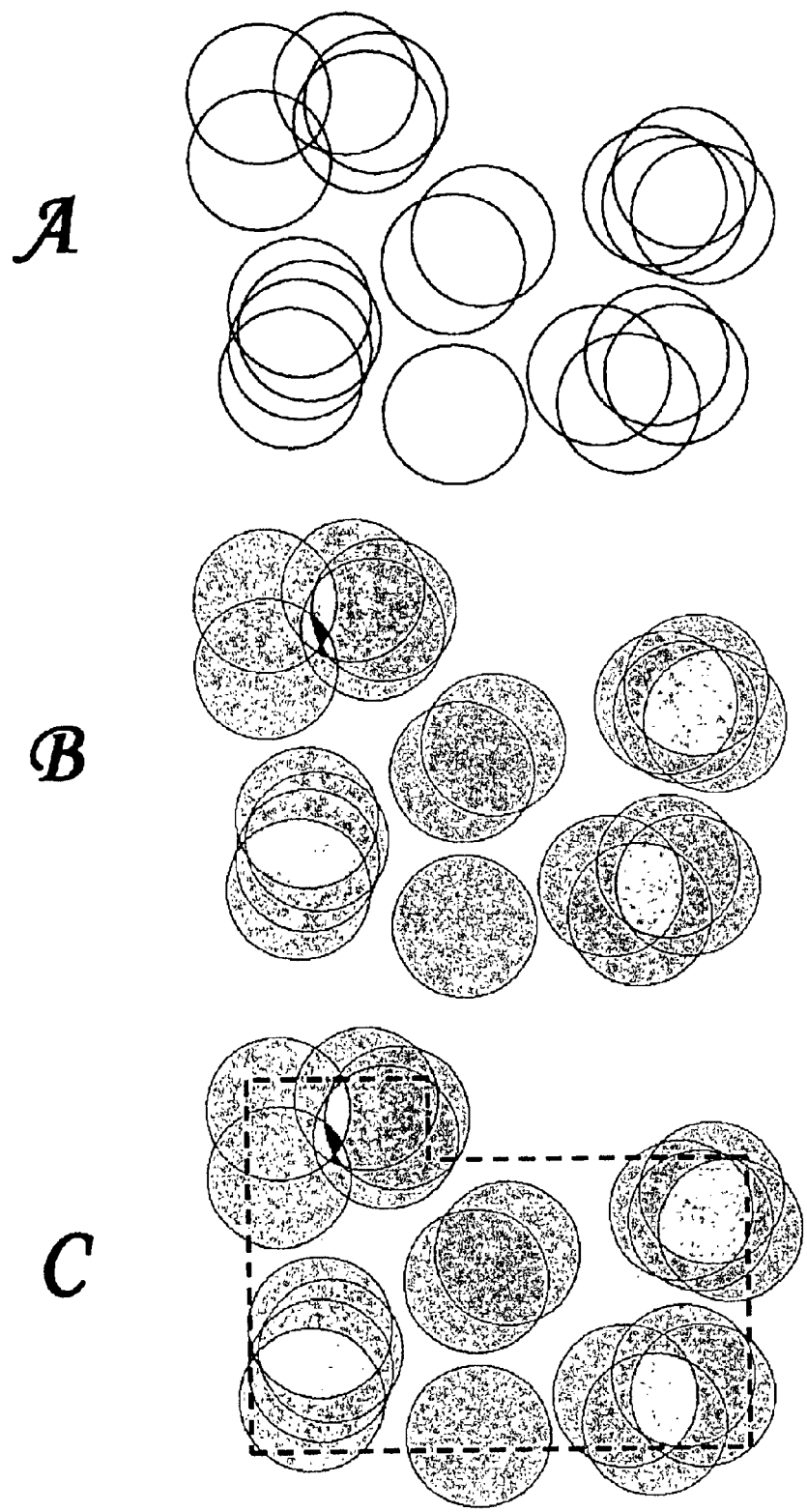
FIG. 12 represents 2D data from a collection of stationary transmissions in the same three categories as FIG. 11 except that each of the shaded areas are not connected to any other, yet still allow the "most likely" boundary of a structure to be defined.

Similarly, FIG. 12 represents transmissions providing only 2D coordinates. As shown at A, these have little movement in the x and y directions, indicating possible "fixed" subscribers, e.g., ones who may be using a CRICKET® phone from an office as a replacement for a hard-wired phone. At B of FIG. 12, is represented the transmissions of A added to an aggregation matrix 400. Although the shaded areas are not connected, they appear to be spatially related since the distance between the connected areas is small relative to the error in transmission. At C is represented an areal pattern formed by clustering the unconnected, but closely spaced, transmissions of B. Thus, the outline yielded at C may be an outline of a small building with a possible reception area. To a police fraud unit, this may indicate operation of a "boiler room" associated with a scam. Thus, there are applications of the present invention other than precision mapping.

Of course, the procedure is repeated 318 for other areas, speeds, times, etc. of interest, thus possibly providing an accurate mapping of a large urban area surrounded by many suburbs or data for planning new roads or business ventures.

Similarly, sorting this data by time of day, day of week, or even time of year may provide information on trends or seasonal variations in positioning, patterns, and movement. All the while this routinely collected data add to the certainty of geospatial position information of fixed structure (that, of course, remains constant) by providing more data from which error may be reduced, thus permitting a precise estimation with high probability. By taking sufficient samples from data routinely collected, precise estimates may be made of rush hour commuting patterns that yield precise coordinates of surface roads and intersections, business locations, plats of residential neighborhoods, weekend, leisure and holiday travel patterns, etc.

In the case of users traveling at high speed, the transmission corridor 200, 210 is a very crude approximation to the actual path of the subscriber. We know that the wireless device was near the coordinates of transmission at the time of transmission. The middle of the transmission corridor 200, 210 might be poorly correlated with the location of the subscriber between successive transmissions. But, as transmission sessions are added to the aggregation matrix 400, patterns emerge. Adding many transmission sessions reinforces the common patterns and isolates the outlying information.

For the aggregation matrix 400 that represents rapid movement, such as vehicular or air traffic, clusters are detected in the matrix by any of a number of commonly available methods of clustering, for example, to detect road boundaries in 2D data, a local maximum may be employed. These clusters are converted into vectors using any of a number of conventional techniques for converting raster data to vectors. By reexamining the transmissions that are used to assemble a feature, one can derive attributes of a feature, based on the patterns of human activity while transmitting. Derived attributes are assigned, such as speed, vehicle load, directionality, number of lanes, etc., based on the individual and summed matrix data.

Spatial coordinates and attributes are stored as digital vector feature maps. For example, by averaging the speeds of the transmission corridors 200, 210 of a section of a road, one can infer the average speed of vehicles over that section of road. This can be further broken down into speed for time of day, for day of week, and for season to derive historical patterns. One can detect changes in behavior patterns by comparing historical patterns to current information. Comparing current information with historical patterns can be used to monitor evacuation routes in times of emergency. A section of road that regularly has great changes in vehicle speed or speed near zero might be a bottleneck.

The number of vehicles on a road cannot be directly inferred, unless a relationship between vehicle density and cell phone usage is available from another source. However, changes in traffic density can be inferred from changes in the number of uniquely coded cellular transmissions.

For an aggregation matrix 400 that represents slower movement such as walking, clusters may be detected also. The features and attribution of this class are different from those of the rapid movement class. Here patterns of motion may be detected in linearly shaped clusters, in the case of a walkway, or in areal clusters, in the case of a pedestrian zone. One can also compute areas where slower wireless traffic is seldom recorded. One can compute the proximity between pedestrian activity and roads or buildings. Height (elevation) values may be examined to determine if they fall into distinct groups. Changes in height can be significant in this class of motion. For example, a staircase or an elevator can be characterized by little movement in the x-y direction and greater movement in the z direction. Elevators can be distinguished from staircases since transmissions in elevators have a higher component of velocity in the z direction.

Figure 13:
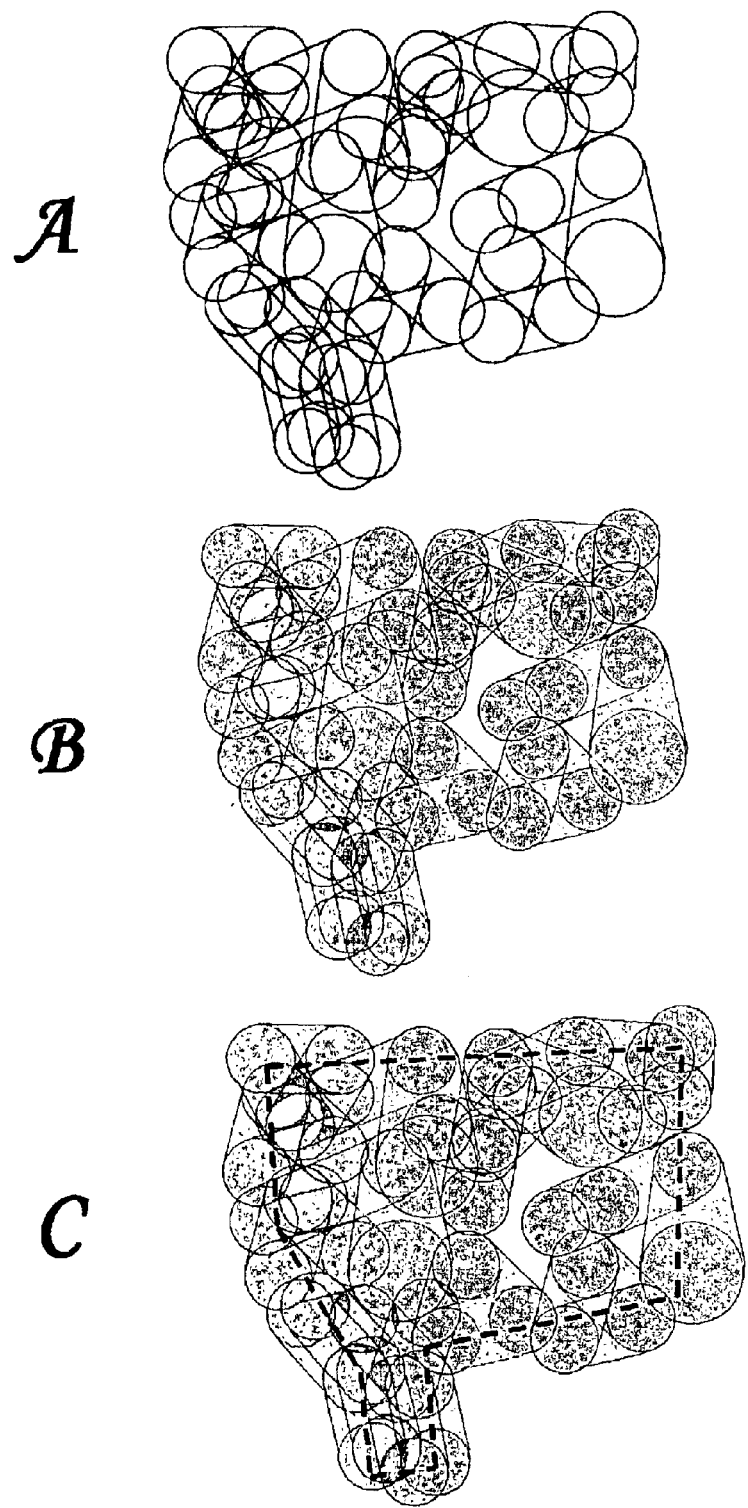
FIG. 13 represents 2D data from a collection of low speed transmission sessions, clusters developed from overlapping weighted transmission sessions, and the "most likely" boundary of an area, such as a parking lot, thus defined by the aggregation matrix.

FIG. 13 at A represents a collection of transmission sessions in which subscribers were proceeding at low speed. The shaded areas at B represent these transmission sessions added to an aggregation matrix 400. From this, at C is yielded a pattern that is a delineation of an areal cluster that may represent a street alongside a small parking lot.

Figure 15:
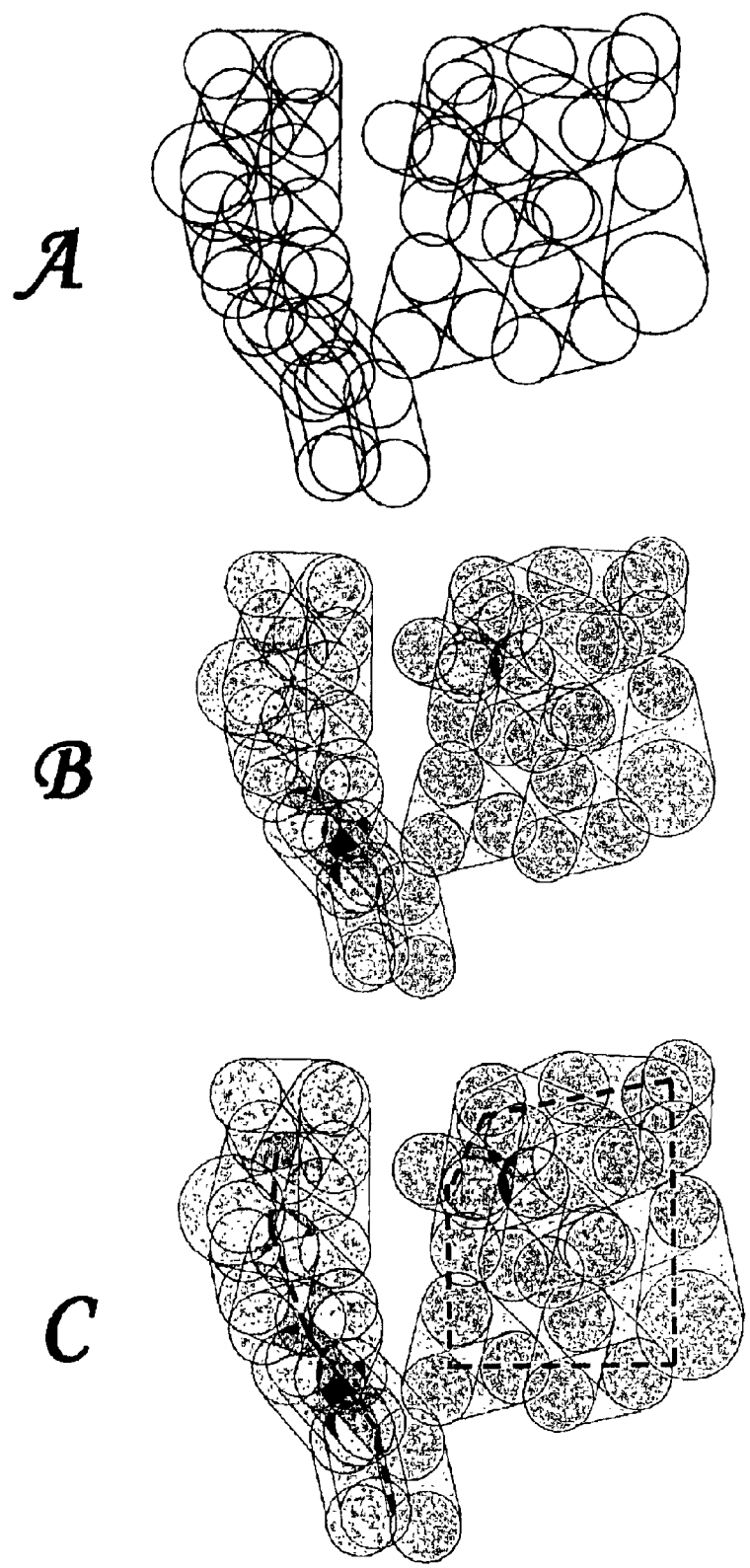
FIG. 15 represents 2D data from a collection of low speed transmission sessions, clusters developed from overlapping weighted transmission sessions, and the "most likely" boundary of both a linear pattern, such as a narrow street, and an areal pattern, such as a small parking lot, thus defined by the aggregation matrix.

FIG. 15 at A also represents a collection of transmission sessions accomplished while subscribers were moving at a low speed. At B is represented the 2D transmission sessions of A that have been added to an aggregation matrix 400. There appears to be a dense linear pattern to the left and a sparse areal pattern to the right. Represented at C are separate linear and areal outlines of patterns of the transmissions of A. This may be a street (linear pattern) at which multiple transmissions may occur during the day and a parking lot (areal pattern) of a small apartment building in which one may expect few telephonic transactions to occur since one would simply use the telephone in the apartment.

FIG. 15 also illustrates that a representation may not always be straightforward.

Simple software routines may have difficulty extracting both linear and areal patterns from a single aggregation matrix 400. Thus, this scenario may require two passes with the software or even human intervention to adjust parameters between passes. Should a priori information be known about the area of interest, this could be merged with the data to assist in assigning attributes.

As in the case of patterns of rapid motion, cellular transmissions from sources of slower movement and their density may be broken down with respect to time of day, day of week, and season, to derive historical patterns. One may compare current information to historical information to detect changes in behavior patterns. The coordinates are stored together with attributes as digital vector feature maps.

Figure 14:
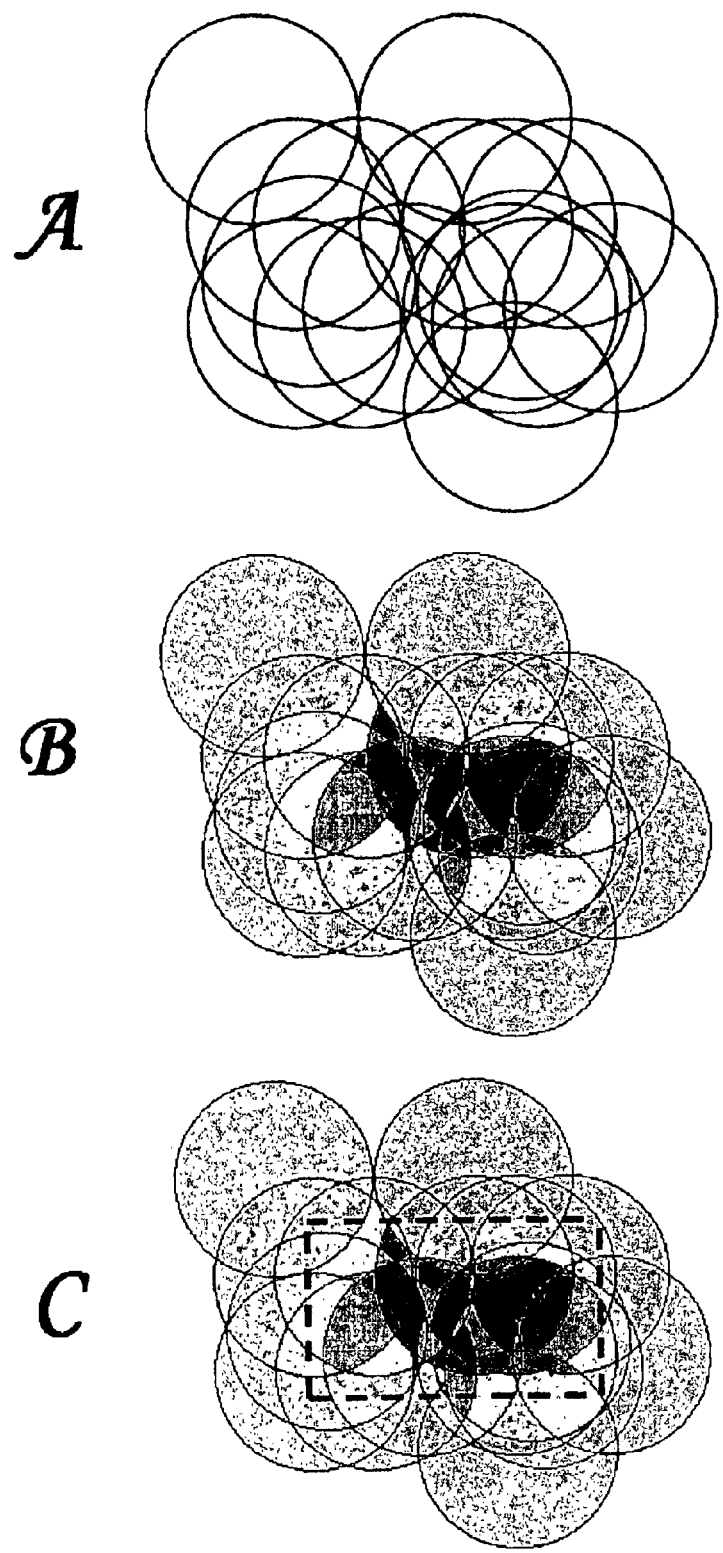
FIG. 14 represents 2D data of weighted transmissions stationary in x and y but changing in the z direction, clusters developed from overlapping transmission sessions, and the "most likely" boundary of a structure, such as an elevator, thus defined by the aggregation matrix.

For the sorted matrix category that represents relatively static or stationary movement, clusters may be detected also. Spatially significant unconnected areas are aggregated. Height values are examined to determine if they fall into distinct groups. For example, an aggregation of unconnected transmission circles might represent a building. Groups of transmission circles 100 (or cylinders 110) with similar z values might represent floors in a building. FIG. 14 at A is a 2D representation of transmissions that are stationary in x and y but differ in z. In this 2D representation all z values have been set to zero. At B is represented the 2D transmission sessions of A after adding to an aggregation matrix 400. Note that the transmission sessions are confined to a location whose size is similar to the error in transmission of a coordinate. At C is represented an areal pattern of the transmissions of A. If the z component of the transmission sessions is too great to indicate pedestrian activity, this shape may represent human movement in an elevator.

Historical patterns of temporal use may distinguish between a residential and a commercial building. Comparing temporal cellular use with other types of data, such as weather or climate, may reveal sheltered areas or even hours of operation of a business. In these cases, derived spatial and temporal attributes may be assigned. Coordinates may be stored along with attributes as digital vector feature maps.

Although specific types of data processing are discussed, other similar configurations or methods, including those that may have only some of the constituents or steps used in the above examples, may be suitable for identifying locations of structure and thus fall within the ambit of a preferred embodiment of the present invention as provided in the claims herein.

We claim:

1. A method of attaining spatial precision in mapping patterns by using data collected from uniquely identified wireless transmissions sessions, comprising:

identifying a source of said routinely collected data, wherein said data includes data points describing spatial information, and wherein each said data point is time-tagged, and wherein each said time-tagged data point is uniquely attributable to one said transmission session;

selecting pre-specified portions of said data points collected from a pre-specified geographic area, wherein said data points may be available from storage devices;

acquiring said pre-specified portions of said data points;

estimating the spatial error about each said data point, wherein said ascertaining of said spatial error may depend on the status of a wireless device or the method of obtaining location data on a position of a wireless device at a particular time of transmission;

sorting said data points by said unique transmission session identifiers;

calculating at least one speed, if any, to be assigned each said transmission session for whom said data points are associated, wherein said speed is calculated by dividing a distance interval between successive said data points by an associated time interval, $\Delta T$, and wherein said speed is assigned to one of a pre-specified range of speeds, and wherein $\Delta T$ represents the time of occurrence of a second transmission of a unique transmission session minus the time of occurrence of a first transmission immediately preceding said second transmission of said unique transmission session;

sorting said data according to said pre-specified ranges of speed, wherein said sorting differentiates categories of said transmission sessions;

converting said representation of said at least one transmission session to weighted cells;

adding said weighted cells of said at least one transmission session to at least one aggregation matrix;

aggregating said weighted cells based on identifying clusters of said data points, wherein said clusters may have a linear or areal shape, or a combination thereof;

converting said cell aggregate to at least one vector representation;

sorting said data according to pre-specified time intervals;

ascertaining at least one attribute of each said at least one vector representation; and from said at least one attribute of each said at least one vector representation, assigning a most likely attribute, wherein said most likely attributes are used to map a precise pattern.

2. The method of claim 1 further comprising calculating historical patterns of activity of said uniquely identified wireless transmission sessions based on at least one said pre-specified time interval.

3. The method of claim 1 further comprising steps to be undertaken after sorting said data according to said pre-specified ranges of speed and before said converting said representation of said at least one transmission session to said weighted cells, said steps comprising:

representing said data from a pair of two successive said uniquely identified wireless transmissions as a transmission corridor; and assembling multiple said transmission corridors, as available, into said at least one transmission session.

4. The method of claim 1 in which said aggregating of said weighted cells is based on spatial clustering of said data points.

5. The method of claim 1 in which said aggregation of said weights is based on connectivity of said data points, wherein said connectivity may be linear or areal, or a combination thereof.

6. The method of claim 1 in which the cell size is no larger than one-half the resolution of the positional accuracy of the spatial coordinates provided in association with said uniquely identified wireless transmission sessions.

7. The method of claim 1 in which said results may be stored prior to mapping said precise pattern.

8. The method of claim 1 in which said results are used to compose precise topographic maps.

9. The method of claim 1 in which said precise patterns may be mapped by manipulating data representing wireless transmissions from sources on conveyances selected from the group consisting of: land-based vehicles, airborne vehicles, waterborne vehicles, space borne vehicles, remotely controlled objects, humans, and animals, and combinations thereof, such as a human on horseback or a human riding in a bus while moving about therein.

10. The method of claim 1 in which said spatial precision is attained in each of three dimensions as referenced to any datum.

11. The method of claim 1 in which said spatial precision is attained in each of two dimensions as referenced to any datum.

12. The method of claim 1 in which said wireless transmissions originate from devices selected from the group consisting essentially of: cellular telephones, laptop computers, personal digital assistants (PDAs), portable communications devices, geopositioning systems, LORAN®, Global Positioning Systems (GPS), beacons, alarms, security systems, and combinations thereof.

13. The method of claim 1 in which said at least one attribute is ascertained by reference to at least one stored library of attributes.

14. The method of claim 13 in which said at least one stored library of attributes is at least one look-up table.

15. A method of developing precise topographic maps by using data routinely collected from uniquely identified wireless transmissions sessions, comprising:

identifying a source of said routinely collected data, wherein said data includes data points describing spatial information, and wherein each said data point is time-tagged, and wherein each said time-tagged data point is uniquely attributable to one said transmission session;

selecting pre-specified portions of said data points collected from a pre-specified geographic area, wherein said data points may be available from storage devices;

acquiring said pre-specified portions of said data points;

estimating the spatial error about each said data point, wherein said ascertaining of said spatial error may depend on the status of a wireless device or the method of obtaining location data on a position of a wireless device at a particular time of transmission;

sorting said data points by said unique transmission session identifiers;

calculating at least one speed, if any, to be assigned each said uniquely identified wireless transmission session for whom said data points are associated, wherein said speed is calculated by dividing a distance interval between successive said data points by an associated time interval, $\Delta T$, and wherein said speed is assigned to one of a pre-specified range of speeds, and wherein $\Delta T$ represents the time of occurrence of a second transmission of said uniquely identified wireless transmission session minus the time of occurrence of a first transmission immediately preceding said second transmission of said uniquely identified wireless transmission session;

sorting said data according to said pre-specified ranges of speed, wherein said sorting differentiates categories of said uniquely identified wireless transmission sessions;

converting said representation of said at least one uniquely identified wireless transmission session to weighted cells;

adding said weighted cells of said at least one uniquely identified wireless transmission session to said aggregation matrix;

aggregating said weighted cells based on identifying clusters of said data points, wherein said clusters may have a linear or areal shape, or a combination thereof;

converting said weighted cell aggregate to at least one vector representation;

sorting said data according to at least one pre-specified time interval;

ascertaining at least one attribute of each said at least one vector representation; and from said at least one attribute of each said at least one vector representation, assigning a most likely attribute, wherein a collection of said most likely attributes is used to develop a precise topographic map.

16. The method of claim 15 further comprising calculating historical patterns of uniquely identified wireless transmission activity based on at least one said at least one pre-specified time interval.

17. The method of claim 15 further comprising steps to be undertaken after sorting said data according to said pre-specified ranges of speed and before said converting said representation of said at least one transmission session to weighted cells, said steps comprising:

representing said data from a pair of two successive said uniquely identified transmissions as a transmission corridor; and assembling multiple said transmission corridors, as available, into said at least one transmission session.

18. The method of claim 15 in which said aggregating of said weighted cells is based on spatial clustering of said data points.

19. The method of claim 15 in which said aggregation of said weights is based on connectivity of said data points, wherein said connectivity may be linear or areal, or a combination thereof.

20. The method of claim 15 in which the cell size is no larger than one-half the resolution of the positional accuracy of the spatial coordinates provided in association with said uniquely identified wireless transmission sessions.

21. The method of claim 15 in which said results may be stored prior to developing said topographic map.

22. The method of claim 15 in which said precise maps are developed by manipulating data representing wireless transmissions from sources on conveyances selected from the group consisting of: land-based vehicles, airborne vehicles, waterborne vehicles, space borne vehicles, remotely controlled objects, humans, and animals, and combinations thereof, such as a human on horseback or a human riding in a bus while moving about therein.

23. The method of claim 15 in which said topographic map is developed in each of three dimensions as referenced to any datum.

24. The method of claim 15 in which said topographic map is developed in each of two dimensions as referenced to any datum.

25. The method of claim 15 in which said wireless transmissions originate from devices selected from the group consisting essentially of: cellular telephones, laptop computers, personal digital assistants (PDAs), portable communications devices, geopositioning systems, LORAN®, Global Positioning Systems (GPS), beacons, alarms, security systems, and combinations thereof.

26. The method of claim 15 in which said at least one attribute is ascertained by reference to at least one stored library of attributes.

27. The method of claim 26 in which said at least one stored library of attributes is at least one look-up table.

* * * * *